United States Patent
Kitahara (10) Patent No.: US 7,389,327 B2
(45) Date of Patent: Jun. 17, 2008

(54) CONTROL AND MONITORING SYSTEM FOR POWER SYSTEM

(75) Inventor: Hideki Kitahara, Tokyo (JP)

(73) Assignee: Mitsubishi Denki Kabushiki Kaisha, Shiyoda-Ku, Tokyo (JP)

( * ) Notice: Subject to any disclaimer, the term of this patent is extended or adjusted under 35 U.S.C. 154(b) by 0 days.

(21) Appl. No.: 11/430,821

(22) Filed: May 10, 2006

(65) Prior Publication Data
US 2006/0259155 A1 Nov. 16, 2006

(30) Foreign Application Priority Data
May 12, 2005 (JP) ............................. 2005-139677

(51) Int. Cl.
*G06F 15/16* (2006.01)
*G06F 3/00* (2006.01)
*G06F 13/00* (2006.01)
*G06F 11/00* (2006.01)
*G06F 15/00* (2006.01)
*G05B 19/18* (2006.01)
*G05B 15/02* (2006.01)
*G05B 23/02* (2006.01)

(52) U.S. Cl. ........................ 709/210; 709/232; 710/17; 710/18; 710/19; 710/37; 710/38; 710/108; 710/109; 702/188; 700/3; 700/9; 340/3.1

(58) Field of Classification Search ................. 710/3–7, 710/15–19, 36–38, 107–110, 200, 309; 700/3, 700/9, 22, 286; 702/188; 709/208–211, 709/223–226, 232–235; 340/3.1–3.9
See application file for complete search history.

(56) References Cited

U.S. PATENT DOCUMENTS 3,693,161 A * 9/1972 Price et al. ..................... 710/38

(Continued)

FOREIGN PATENT DOCUMENTS

JP 11-134001 5/1999

(Continued)

*Primary Examiner*—Crystal Barnes-Bullock
(74) *Attorney, Agent, or Firm*—Buchanan Ingersoll & Rooney PC (57) ABSTRACT

The object of the present invention is to make information necessary for judging whether control output is possible closer to the latest information than in the conventional method or made the latest, and shorten the time from control start to control execution. In a control and monitoring system for a power system which controls monitoring control objects by supplying a control instruction from a master unit 6 to a plurality of input/output terminal devices BCU1, BCU2, and so on provided for each of the plurality of monitoring control objects in a power system, the master unit 6 starts operations to acquire information necessary for judging whether control output to the input/output terminal devices BCU1, BCU2, and so on is possible at the time of control object selection notification from the master unit 6 to the input/output terminal devices BCU1, BCU2, and so on.

9 Claims, 8 Drawing Sheets

U.S. PATENT DOCUMENTS

| | | | | |
|---|---|---|---|---|
| 4,328,586 | A * | 5/1982 | Hansen | 375/257 |
| 4,368,514 | A * | 1/1983 | Persaud et al. | 709/211 |
| 4,751,727 | A * | 6/1988 | Brahm et al. | 379/28 |
| 5,488,693 | A * | 1/1996 | Houck et al. | 709/208 |
| 5,739,760 | A * | 4/1998 | Hatakeyama | 340/3.32 |
| 5,768,543 | A * | 6/1998 | Hiles | 710/107 |
| 5,978,876 | A * | 11/1999 | Greaves | 710/107 |
| 6,032,178 | A * | 2/2000 | Bacigalupo et al. | 709/208 |
| 6,289,403 | B1 * | 9/2001 | Fodor | 710/52 |
| 6,553,434 | B1 * | 4/2003 | Abkarian et al. | 710/18 |
| 6,618,628 | B1 * | 9/2003 | Davlin et al. | 700/3 |
| 6,807,593 | B1 * | 10/2004 | Moss et al. | 710/110 |
| 7,062,359 | B2 * | 6/2006 | Bjorklund | 700/286 |
| 7,099,983 | B2 * | 8/2006 | Emerson et al. | 710/306 |
| 2004/0073729 | A1 * | 4/2004 | Kniffler et al. | 710/110 |

FOREIGN PATENT DOCUMENTS

JP      2001178025 A * 6/2001

* cited by examiner

CONTROL AND MONITORING SYSTEM FOR POWER SYSTEM

BACKGROUND OF THE INVENTION

1. Field of the Invention

The invention relates to a control and monitoring system for a power system which controls a monitoring control object by supplying a control instruction from a master unit to a plurality of input/output terminal devices provided for each of a plurality of monitoring control objects in a power system of a substation or the like.

2. Description of the Related Art

A control and monitoring system for a power system of a substation or the like monitors, for example, voltage fluctuation, current changes, power flow changes, and line abnormalities, and according to these states, supplies a control instruction from a master unit to a plurality of input/output terminal devices provided for each of a plurality of monitoring control objects and controls a monitoring control object such as switching control of a transformer tap as a monitoring control object and ON/OFF control of circuit breakers and disconnecting switches as monitoring control objects of the power system in the substation or the like.

When supplying a control instruction from the master unit to the plurality of input/output terminal devices, the master unit grasps information on, for example, a current state (position) of a transformer tap as a monitoring control object and ON/OFF states of circuit breakers and disconnecting switches as monitoring control objects, and according to the information, an input/output terminal device appropriate for controlling is selected and an appropriate control instruction is supplied to the selected input/output terminal device.

Conventionally, as one of the control methods, when starting control, before a control object is selected among the plurality of input/output terminal devices, the master unit collects the information to be used for judging whether control such as interlock check, etc., is possible, and based on the information, selects an input/output terminal device of the control object, and outputs a control instruction (hereinafter, referred to as "conventional method 1").

Figure 4:
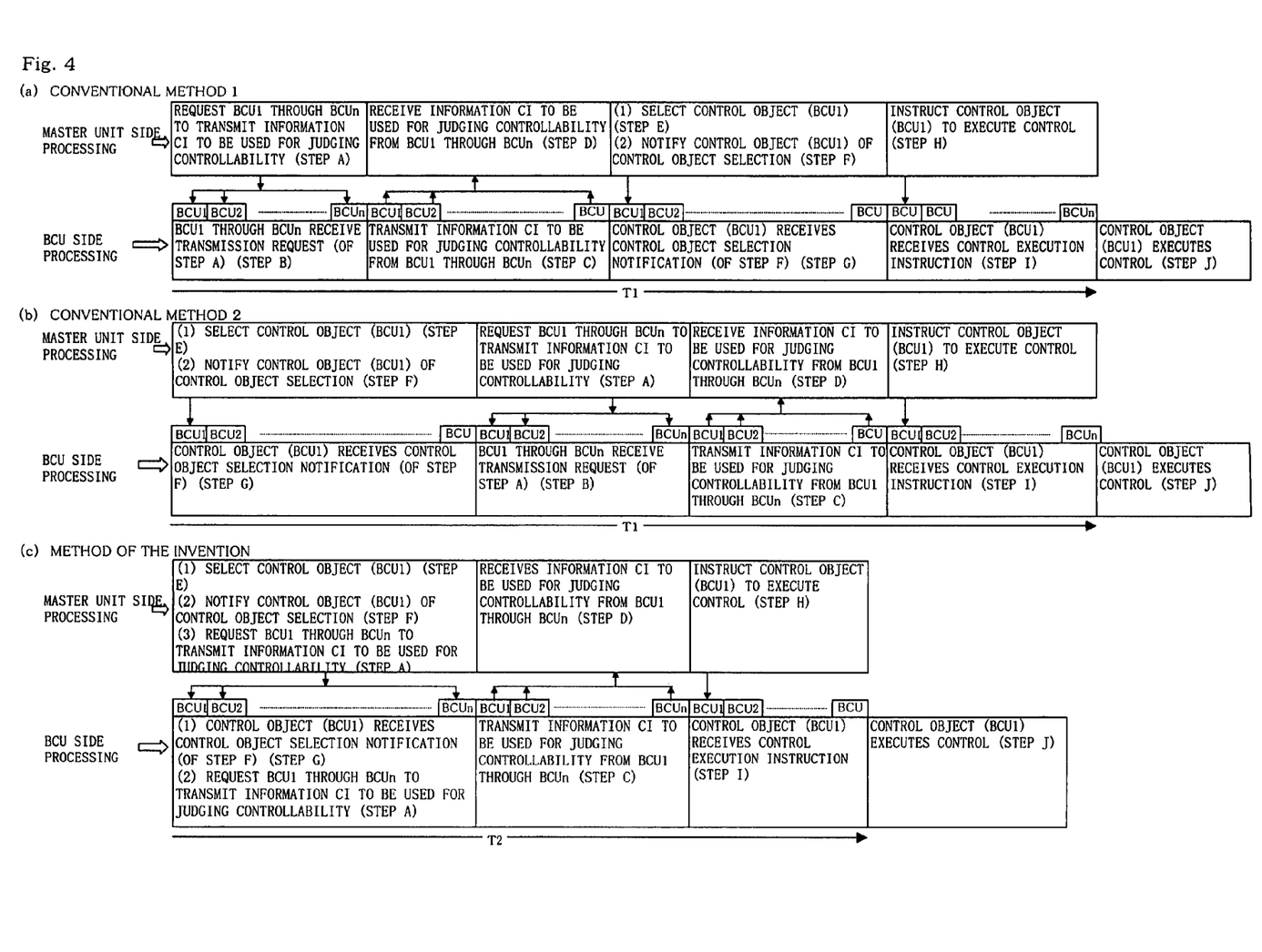
FIG. 4 is a drawing of the first embodiment of the invention, for explaining an operation difference and an effect difference between the conventional method 1 and conventional method 2 and the first embodiment of the invention.

In this conventional method 1, in detail, the procedures shown in FIG. 4(a) are followed. Namely, first, the master unit side requests the respective input/output terminal devices BCU1 through BCUn to transmit the information CI to be used for judging controllability (information on the states of the monitoring control object such as a transformer tap state (position) and ON/OFF states of circuit breakers and disconnecting switches) (step A). Next, on the input/output terminal device BCU side, the respective input/output terminal devices BCU1 through BCUn receive the transmission request (of step A) (step B). Then, on the input/output terminal device BCU side, the information CI to be used for judging controllability is transmitted from the input/output terminal device BCU1 through BCUn (step C). Then, the master unit side receives the information CI to be used for judging controllability from the respective input/output terminal devices BCU1 through BCUn (step D). Thereafter, the master unit side makes judgement of controllability based on the received information CI, and when control is possible, the master unit side (1) selects, for example, the input/output terminal device BCU1 as a control object (step E), and (2) notifies the input/output terminal apparatus BCU1 selected as a control object that it was selected as a control object (step F). Then, the input/output terminal device BCU1 selected as a control object receives the control object selection notification (of step F) (step G). After the input/output terminal device BCU1 receives the control object selection notification (of step F) (step G), the master unit side instructs the control object input/output terminal device BCU1 to execute control (step H). Thereafter, the input/output terminal device BCU1 selected as a control object receives the control execution instruction (of step H) (step I), and executes control (step J).

In this conventional method 1, as described above, the information CI (information on the states of monitoring control objects such as the transformer tap state (position) and ON/OFF states of circuit breakers and disconnecting switches as described above) is collected first, so that at the time when the input/output terminal device BCU1 selected as a control object executes control (step J), the information CI may become old (different from the current information), and therefore, proper control may not be performed.

Therefore, in order to improve this, in some methods, the information CI to be used for judging controllability is collected after selection of the input/output terminal device and notification of the selection (hereinafter, referred to as "conventional method 2").

This conventional method 2 is carried out according to the procedures shown in FIG. 4(b) in detail. Namely, first, the master unit side (1) selects, for example, the input/output terminal device BCU1 as a control object (step E), and (2) notifies the input/output terminal device BCU1 selected as a control object that it was selected as a control object (step F). Then, the input/output terminal device BCU1 selected as a control object receives the control object selection notification (of step F) (step G). Then, the master unit side requests the respective input/output terminal devices BCU1 through BCUn to transmit the information CI to be used for judging controllability (information on the states of monitoring control objects such as the transformer tap state (position) and ON/OFF states of circuit breakers and disconnecting switches) (step A). Then, on the input/output terminal device BCU side, the respective input/output terminal devices BCU1 through BCUn receive the transmission request (of step A) (step B). Then, on the input/output terminal device BCU side, the respective input/output terminal devices BCU1 through BCUn transmit the information CI to be used for judging controllability (step C). Thereafter, the master unit side receives the information CI to be used for judging controllability from the respective input/output terminal devices BCU1 through BCUn (step D). Next, the master unit side judges controllability based on the received information CI, and when control is possible, it instructs the control object input/output terminal device BCU1 to execute control (step H). Then, the input/output terminal device BCU1 selected as a control object receives the control execution instruction (of step H) (step I), and executes control (step J).

The conventional method 1 and the conventional method 2 as aforementioned are not described in detail, however, for example, Japanese Published Unexamined Patent Application No. 11-134001 (Patent document 1) is available.

Patent document 1: Japanese Published Unexamined Patent Application No. H11-134001 (FIG. 1 and explanation thereof)

In the aforementioned conventional method 1 and conventional method 2, control is performed according to the aforementioned procedures, so that both of these require the time T1 from step A of control start to step J of control execution. The shorter the time from step A of control start to step J of control execution the better for more quick control. In the conventional method 1 and conventional method 2, the control object selection notification (step F) to notify of selection for control and the control execution instruction (step H) are both performed for only the selected input/output terminal device BCU1, so that in the input/output terminal devices BCU2 through BCUn that are not selected, multiple control may be performed even during control by the selected input/output terminal device BCU1, and therefore, it is preferable to prevent this multiple control.

The invention was developed in view of the conventional circumstances described above, and a first object thereof is to make the information necessary for judging whether control output is possible closer to the latest information than in the conventional method 1, or made the latest, and shorten the time from the control start to control execution.

Furthermore, the invention was developed in view of the conventional circumstances described above, and a second object thereof is to prevent multiple control of the input/output terminal devices that are not selected during control of the selected input/output terminal device.

SUMMARY OF THE INVENTION

According to a control and monitoring system for a power system according to the invention, in a control and monitoring system for a power system which controls monitoring control objects by supplying a control instruction from a master unit to a plurality of input/output terminal devices provided for each of the plurality of monitoring control objects in a power system, the master unit starts operations to acquire information necessary for judging whether control output to the input/output terminal devices is possible at the time of control object selection notification from the master unit to the input/output terminal devices.

Furthermore, according to a control and monitoring system for a power system according to the invention, in a control and monitoring system for a power system which controls monitoring control objects by supplying a control instruction from a master unit to a plurality of input/output terminal devices provided for each of the plurality of monitoring control objects in a power system, the master unit starts operations to acquire information necessary for judging whether control output to the input/output terminal devices is possible at the time of control object selection notification from the master unit to the input/output terminal devices, and the control object selection notification containing information for specifying a control object input/output terminal device selected as a control object is also performed to input/output terminal devices that are not selected as control objects.

According to the invention, as described above, in a control and monitoring system for a power system which controls monitoring control objects by supplying a control instruction from a master unit to a plurality of input/output terminal devices provided for each of the plurality of monitoring control objects in a power system, the master unit starts operations to acquire information necessary for judging whether control output to the input/output terminal devices is possible at the time of control object selection notification from the master unit to the input/output terminal devices, so that information necessary for judging whether control output is possible can be made closer to the latest information than in the conventional method 1, or made the latest, and the time from the control start to control execution can be shortened.

Furthermore, according to the invention, in a control and monitoring system for a power system which controls monitoring control objects by supplying a control instruction from a master unit to a plurality of input/output terminal devices provided for each of the plurality of monitoring control objects in a power system, the master unit starts operations to acquire information necessary for judging whether control output to the input/output terminal devices is possible at the time of control object selection notification from the master unit to the input/output terminal devices, and the control object selection notification containing information for specifying a control object input/output terminal device selected as a control object is also performed to input/output terminal devices that are not selected as control objects, so that multiple control of the input/output terminal devices that are not selected can be prevented during control of the selected input/output terminal device.

DETAILED DESCRIPTION OF THE PREFERRED EMBODIMENTS

First Embodiment

Figure 1:
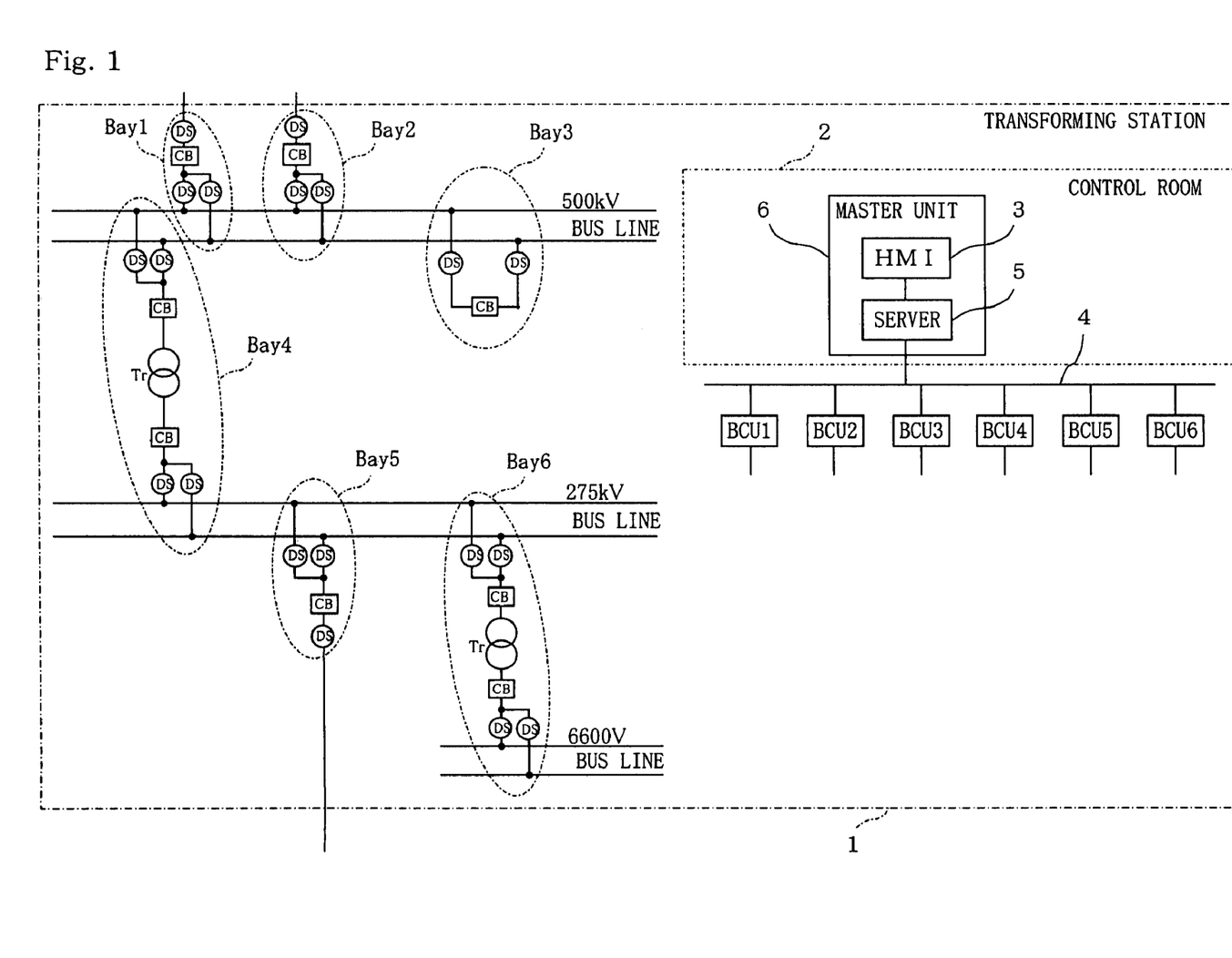
FIG. 1 is a drawing of the first embodiment of the invention, showing an example of a power system in a substation.
Figure 2:
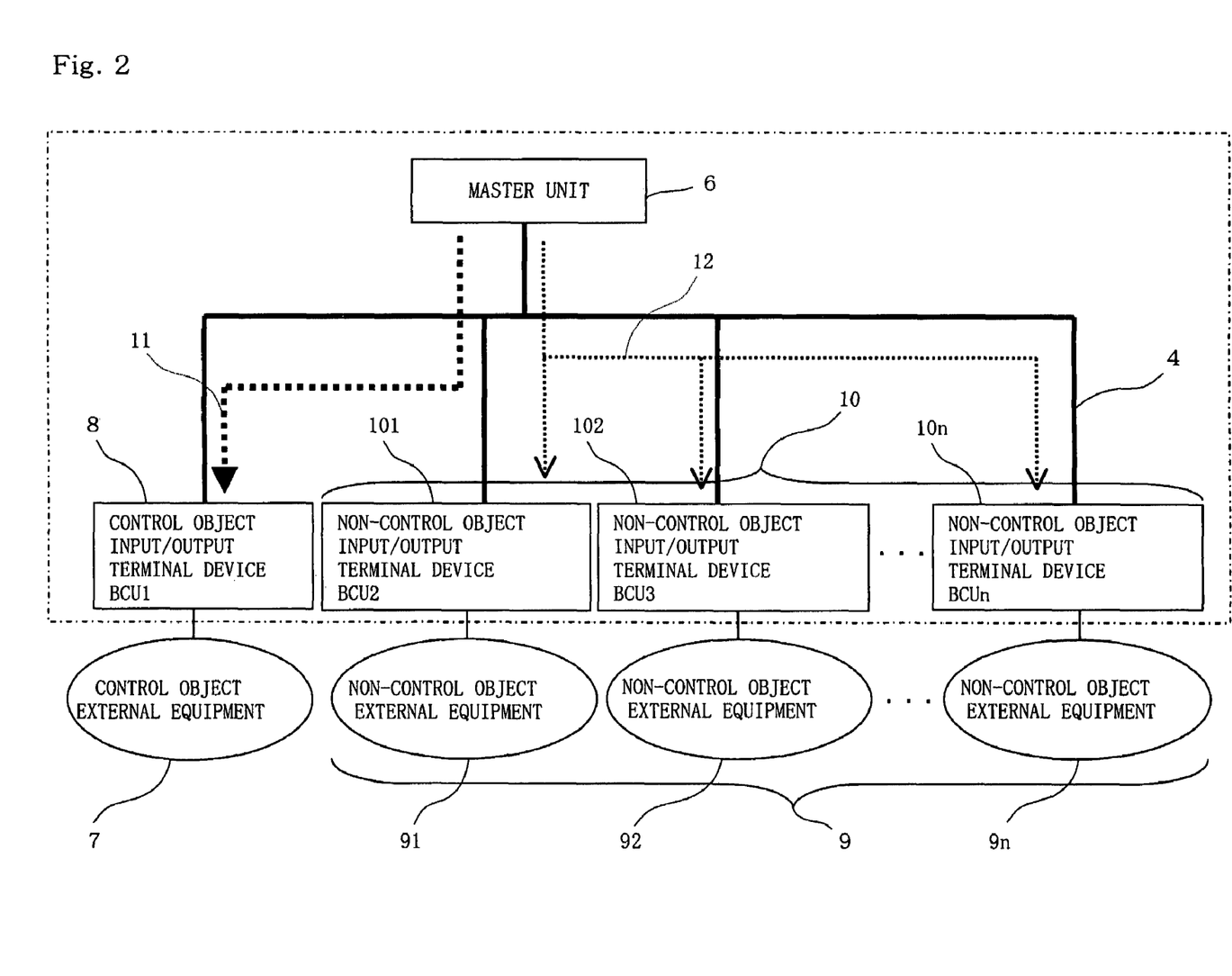
FIG. 2 is a drawing of the first embodiment of the invention, for explaining an example of connection among a master unit, a control object input/output terminal device, non-control object input/output terminal devices, control object external equipment, and non-control object external equipment, and operations thereof.
Figure 3:
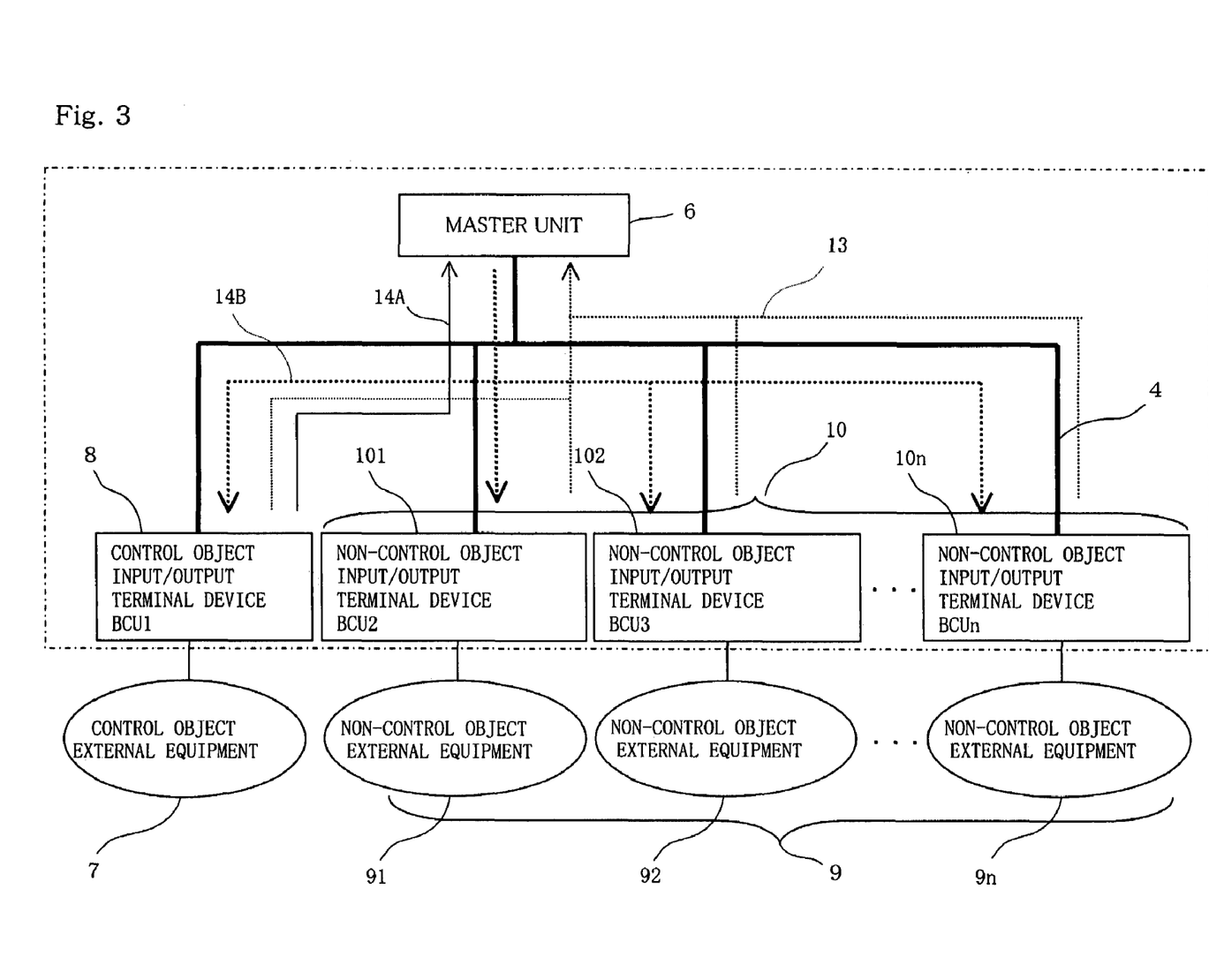
FIG. 3 is a drawing of the first embodiment of the invention, for explaining an example of connection among a master unit, a control object input/output terminal device, non-control object input/output terminal devices, control object external equipment, and non-control object external equipment, and operations thereof.
Figure 5:
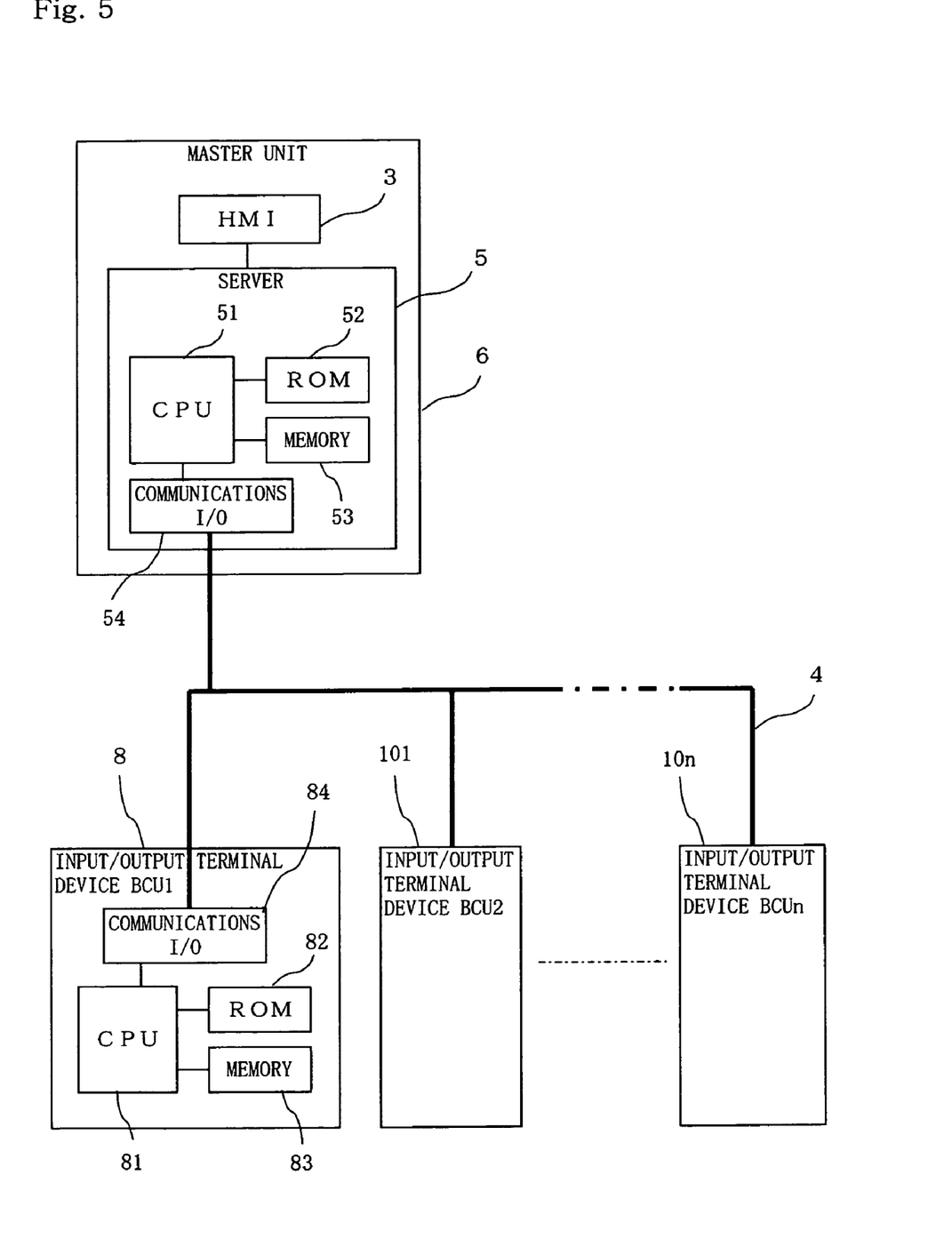
FIG. 5 is a drawing of the first embodiment of the invention, showing the internal configurations of the master unit and the input/output terminal device.

Hereinafter, a first embodiment of the invention will be explained with reference to FIG. 1 through FIG. 5. FIG. 1 is a drawing showing an example of a power system in a substation, FIG. 2 is a drawing for explaining an example of connection among a master unit, a control object input/output terminal device, non-control object input/output terminal devices, control object external equipment, and non-control object external equipment, and operations thereof, FIG. 3 is a drawing for explaining an example of connection among a master unit, a control object input/output terminal device, non-control object input/output terminal devices, control object external equipment, and non-control object external equipment, and operations thereof, FIG. 4 is an explanatory view of an operation difference and an effect difference between the conventional method 1 and the conventional method 2 and this first embodiment of the invention, and FIG. 5 is a drawing showing internal configurations of the master unit and the input/output terminal devices. In the drawings, the symbols identical to each other indicate the same portion.

As shown in FIG. 1, for example, in the power system in the substation 1, many monitoring control objects such as transformers Tr, circuit breakers CB, disconnecting switches DS, and relays (not shown) are installed.

The power system comprises a plurality of control and monitoring units called BAY, that is, Bay 1, Bay 2, and so on. For the monitoring control objects (transformers Tr, circuit breakers CB, and disconnecting switches DS, etc.) of the respective control and monitoring units Bay 1, Bay 2, and so on, input/output terminal devices BCU1, BCU2, and so on for monitoring control are provided, and these input/output terminal devices BCU1, BCU2, and so on are connected to an HMI (monitoring control terminal with a display device) 3 in a control room 2 via a communications network 4 such as LAN and a server 5, and the control and monitoring units Bay 1, Bay 2, and so on are individually monitored and controlled by the corresponding input/output terminal devices BCU1, BCU2, and so on, and furthermore totally monitored and controlled by the HMI 3. The HMI 3 and the server 5 compose the master unit 6.

In such a power system, as described above, for example, voltage fluctuation, current changes, power flow changes, and line abnormalities, etc., are monitored, and according to the states of these, in the power system in the substation, monitoring control objects are controlled such as switching control of a transformer tap as a monitoring control object, ON/OFF control of circuit breakers and disconnecting switches as monitoring control objects, by supplying a control instruction from the master unit to the plurality of input/output terminal devices provided for each of the plurality of monitoring control objects.

In FIG. 2, to the master unit 6 that outputs a control instruction, a control object input/output terminal device 8 connected to a control object external equipment 7 corresponding to the control instruction, and a non-control object input/output terminal device group 10 of non-control object input/output terminal devices 101, 102 . . . 10n that is not controlled according to the control, to which a plurality of other non-control object external equipment 91, 92 . . . 9n (i.e. group 9) is connected, are connected via a communications line 4 such as LAN or the like.

According to control operations of the control and monitoring system thus configured, in response to a selection instruction (notification that selection as a control object was made) 11 notified before a control instruction from the master unit 6 and notification 12 to the non-control object input/output terminal device group 10, the non-control object input/output terminal 10 that is not controlled recognizes the notification 12 and restrains control operations in their own devices, and replies (see FIG. 3) the latest external equipment states 13 held by their own devices to the master unit 6. The control object input/output terminal device 8 to which control object equipment corresponding to this control instruction is connected also replies the latest information to the master unit 6, and waits for a control execution instruction.

The master unit 6 compares controllability conditions with predetermined conditions based on the latest information received from the control object input/output terminal device 8 and the non-control object input/output terminal device group 10, and when it judges that control is possible, the master unit 6 outputs a control instruction to the control object input/output terminal device 8, and the control object input/output terminal device 8 receives this instruction and outputs control to the external equipment 7.

The control object input/output terminal device 8 judges completion of the control and outputs completion notification 14A to the master unit 6, and the master unit 6 notifies the control object input/output terminal device 8 and the non-control object input/output terminal device group 10 of the control completion 14B. Responsively, the non-control object input/output terminal device group 10 cancels control restraining.

Detailed procedures of the above-described operation will be explained with reference to FIG. 4. First, the master unit side (1) selects, for example, the input/output terminal device BCU1 as a control object (step E), (2) notifies the input/output terminal device BCU1 selected as a control object that it was selected as a control object (step F), and (3) the master unit side requests the respective input/output terminal devices BCU1 through BCUn to transmit the information CI to be used for controllability judgement (information on the states of monitoring control objects such as the transformer tap state (position) and ON/OFF states of circuit breakers and disconnecting switches) (step A). Then, on the BCU side, (1) the input/output terminal device BCU1 selected as a control object receives the control object selection notification (of step F) (step G). (2) The respective input/output terminal devices BCU1 through BCUn receive the transmission request (of step A) (step B). Then, on the input/output terminal device BCU side, the respective input/output terminal devices BCU1 through BCUn transmit the information CI to be used for controllability judgement (step C). Then, the master unit side receives the information CI to be used for controllability judgement from the respective input/output terminal devices BCU1 through BCUn (step D). The master unit side judges controllability based on the received information CI, and when control is possible, the master unit side instructs the control object input/output terminal device BCU1 to execute control (step H). Then, the input/output terminal device BCU1 selected as a control object receives the control execution instruction (of step H) (step I), and executes control (step J).

The input/output terminal devices 101, 102 . . . 10n that were not selected as control objects function to block control for the corresponding monitoring control objects according to the control object selection notification so as not to control the corresponding monitoring control objects during control of the input/output terminal device 8 selected as a control object.

As described above, in the first embodiment of the invention, at the beginning of the control start, (1) for example, the input/output terminal device BCU1 is selected as a control object (step E), (2) the input/output terminal device BCU1 selected as a control object is notified that it was selected as a control object (step F), and (3) the master unit side requests the input/output terminal devices BCU1 through BCUn to transmit the information CI to be used for controllability judgement (information on the states of monitoring control objects such as the transformer tap state (position) and ON/OFF states of circuit breakers and disconnecting switches, etc.) (step A). Therefore, as shown in FIG. 4(c), the time T2 from the control start to the control execution (step J) becomes shorter than the time T1 of the conventional method 1 and the conventional method 2. Namely, time T2<time T1, and accordingly, control is executed more quickly.

In addition, in the first embodiment of the invention, as shown in FIGS. 2 and 4(c), the control object selection notification containing information for specifying the control object input/output terminal device 8 selected as a control object is also outputted to the input/output terminal devices 101,102 . . . 10n that were not selected as control objects, so that the input/output terminal devices 101, 102 . . . 10n that were not selected can recognize that the control object input/output terminal device 8 selected as a control object is under control, so that multiple control by the input/output terminal devices 101, 102 . . . 10n that were not selected can be prevented during execution of control by the control object input/output terminal device 8 selected as a control object.

As shown in FIG. 5, the server 5 of the master unit 6 has a CPU 51, a ROM 52, a memory (RAM or nonvolatile memory) 53, and a communications I/O 54, and the respective input/output terminal devices BCU1, BCU2, and so on also have a CPU 81, a ROM 82, a memory (RAM or nonvolatile memory) 83, and a communications I/O 84, the communications I/O 84 of the input/output terminal devices BCU1, BCU2, and so on are connected to the communications I/O 54 of the master unit 6 through a communications line 4 such as a LAN, and the above-described operations are performed by S/W in the ROM 52 and CPU 51 of the master unit 6 and S/W in the ROMs 82 and CPUs 81 of the respective input/output terminal devices BCU1, BCU2, and so on. The memory (RAM or nonvolatile memory) 53 of the master unit 6 stores the collected information CI necessary for the controllability judgement, and the memories (RAMs or nonvolatile memories) 83 of the input/output terminal devices BCU1, BCU2, and so on store notification and information on the instruction from the master unit 6.

Second Embodiment

Figure 6:
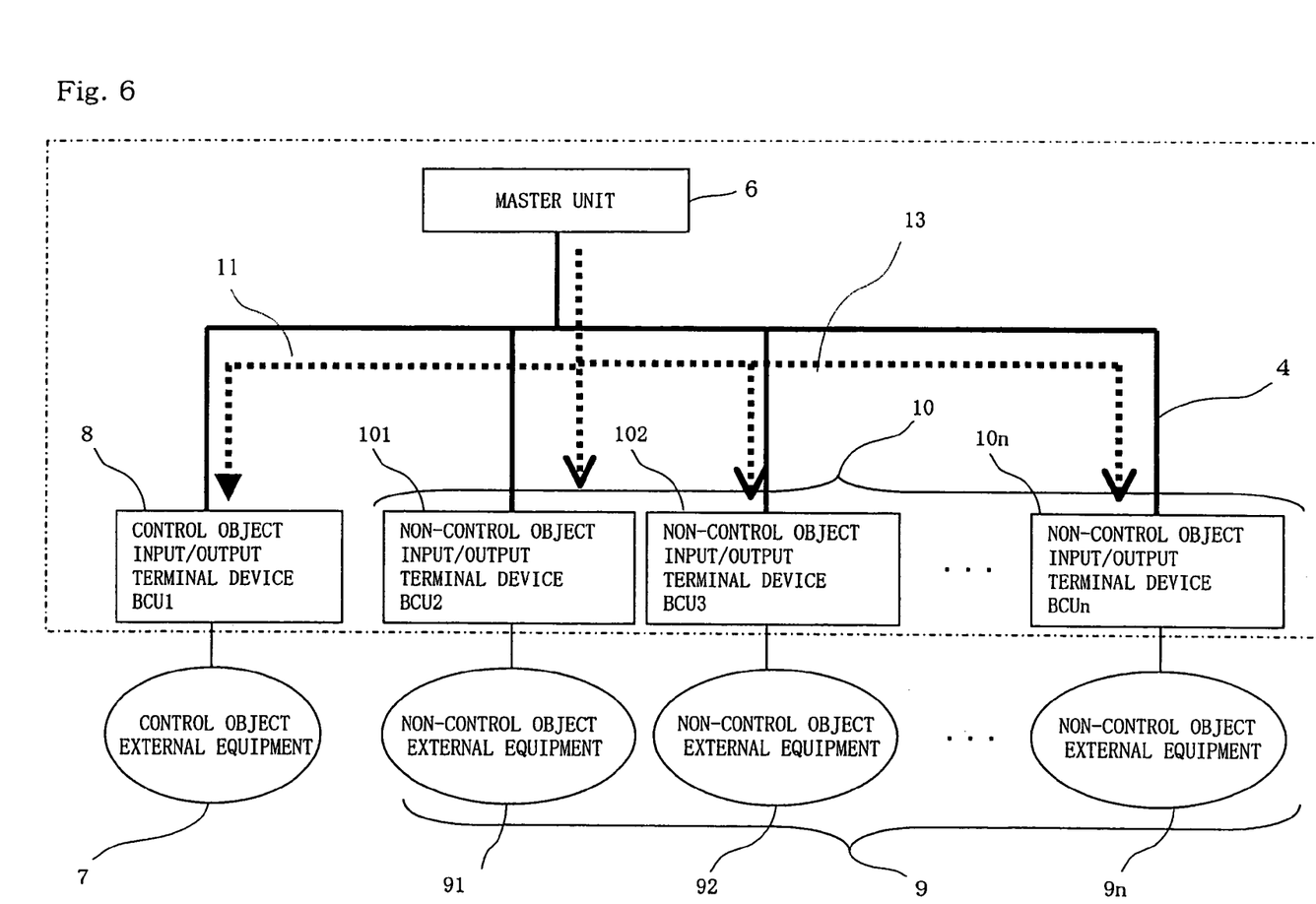
FIG. 6 is a drawing of the second embodiment of the invention, for explaining an example of connection among a master unit, an a control object input/output terminal device, non-control object input/output terminal devices, control object external equipment, and non-control object external equipment, and operations thereof.

Hereinafter, a second embodiment of the invention will be explained with reference to FIG. 6. FIG. 6 is a drawing for explaining an example of connection among a master unit, a control object input/output terminal device, non-control object input/output terminal devices, control object external equipment, and non-control object external equipment, and operations thereof, and the portions identical to or corresponding to those in FIG. 1 through FIG. 5 are attached with the same symbols. The explanation of the second embodiment of the invention is focused on a difference from the first embodiment of the invention described above, and explanation of other matters is omitted.

In the first embodiment, a signal of the selection instruction 11 and a signal of the notification 12 are separated from each other as illustrated, however, by notifying all input/output terminal devices of the selection instruction 11 as shown in FIG. 6 containing the control object information and handling this instruction as replacement of the notification 12 in the non-control object input/output terminal device group 10, that is, if operations to acquire information necessary for judging whether control output to the input/output terminal devices is possible are started in response to an information transmission request outputted from the master unit to the respective input/output terminal devices and the information transmission request and the control object selection notification are contained in one signal, the notification 12 can be omitted. In this case, the procedures can be reduced one more. Therefore, it becomes possible to shorten the time required to control and simplify the procedures.

Third Embodiment

Figure 7:
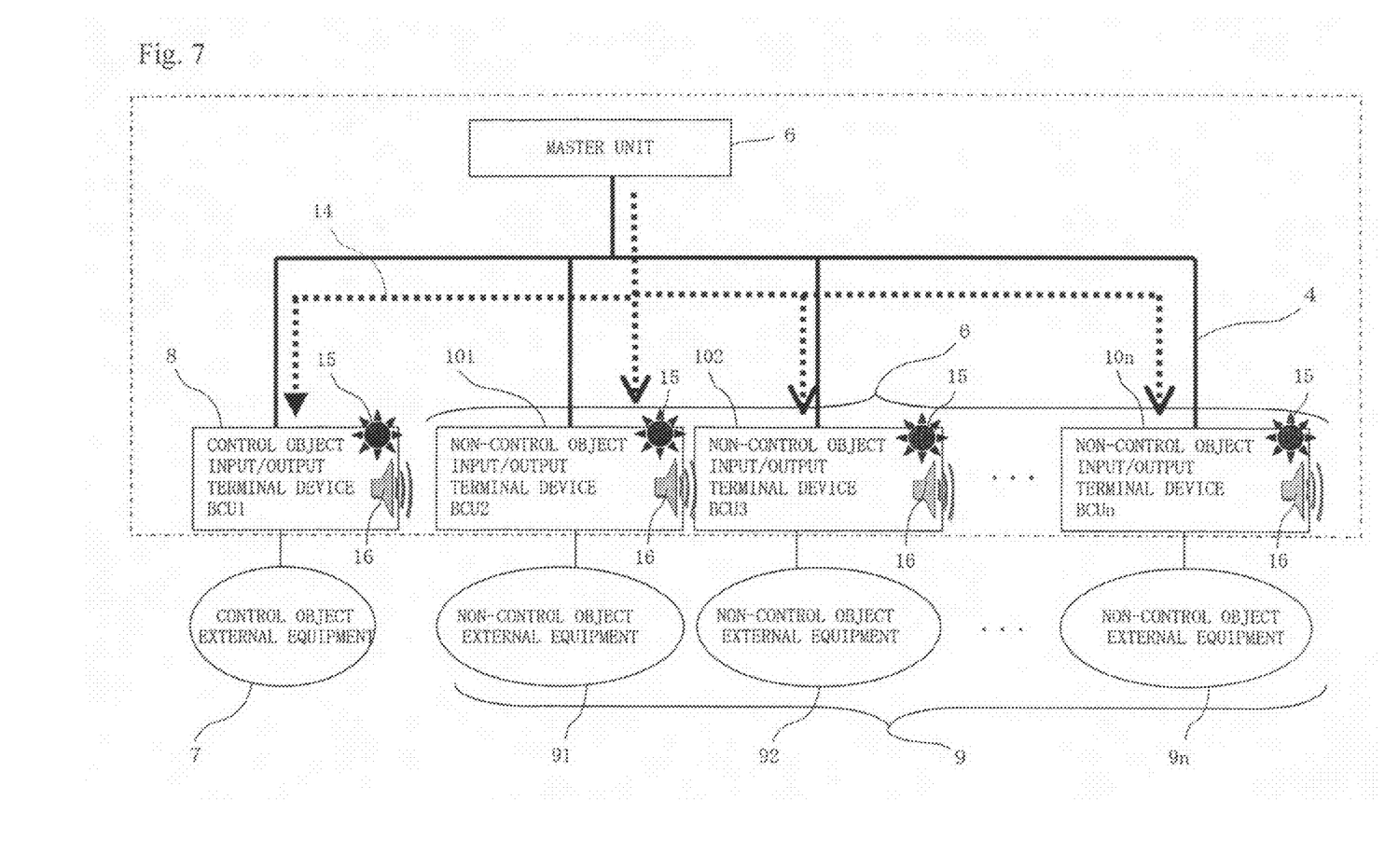
FIG. 7 is a drawing of the third embodiment of the invention, for explaining an example of connection among a master unit, a control object input/output terminal device, non-control object input/output terminal devices, control object external equipment, and non-control object external equipment, and operations thereof.

Hereinafter, a third embodiment of the invention is explained with reference to FIG. 7. FIG. 7 is a drawing for explaining an example of connection among the master unit, a control object input/output terminal device, non-control object input/output terminal devices, control object external equipment, and non-control object external equipment, and operations thereof, and portions identical to or corresponding to those in FIG. 1 through FIG. 6 are attached with the same symbols. The explanation of the third embodiment of the invention is focused on a difference from the first and second embodiments of the invention, and explanation of others is omitted.

In the first and second embodiments of the invention described above, when the control object input/output terminal device 8 and a part or all of the non-control object input/output terminal device group 10 are dispersed, the notification that the respective non-control object input/output terminal devices BCU1, BCU2 and so on of the non-control object input/output terminal device group 10 that received the selection instruction 12 (11 in the second embodiment) are in a control starting state is individually outputted to the outside, whereby the information of the current state under control by another terminal is clearly informed by means of, for example as shown in FIG. 7, a display device 15 or voice announcement 16, and control from the outside performed for the individual non-control object input/output terminal devices BCU1, BCU2, and so on of the non-control object input/output terminal device group 10 can be restrained from being individually controlled from the outside.

Fourth Embodiment

Figure 8:
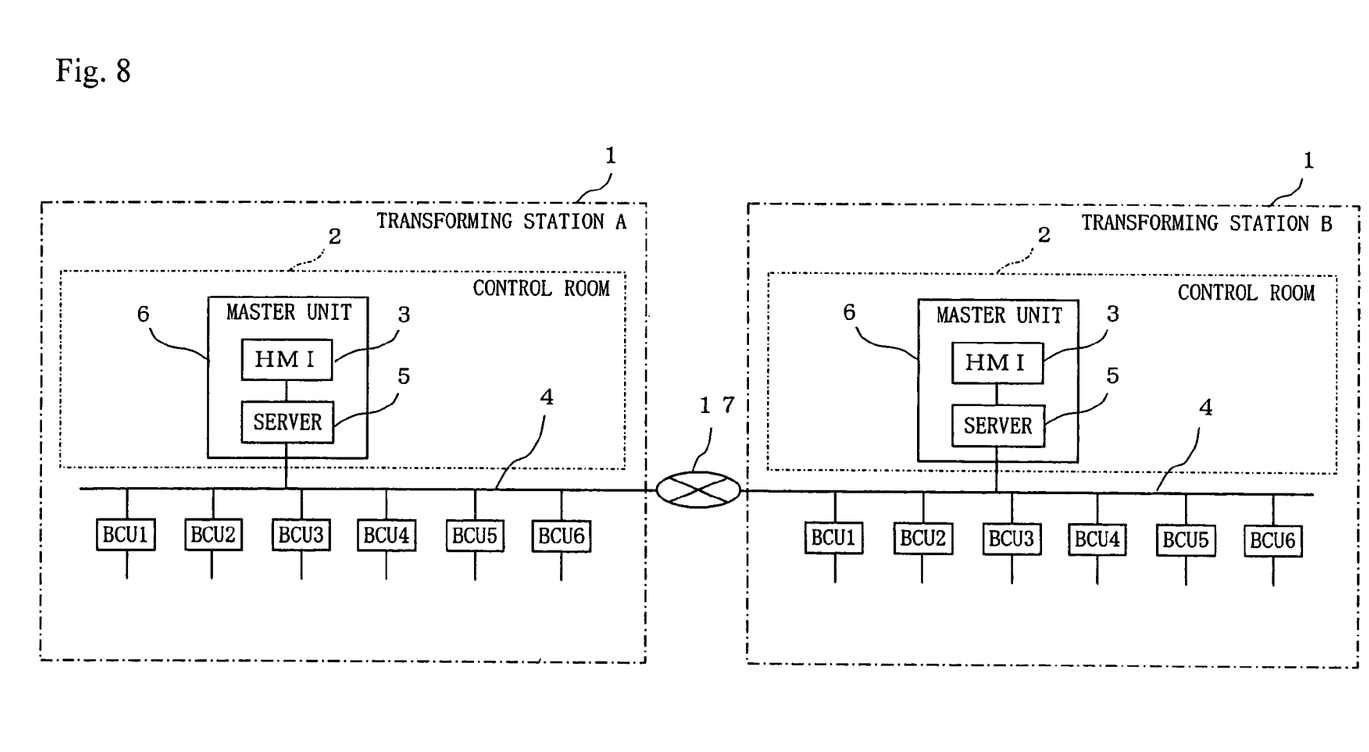
FIG. 8 is a drawing of the fourth embodiment of the invention, showing connection to a control and monitoring system of another substation or power plant through an exclusive line 17 such as an extranet.

Hereinafter, a fourth embodiment of the invention will be explained with reference to FIG. 8 showing an example of a power system in a substation. In FIG. 8, portions identical to or corresponding to those in FIG. 1 through FIG. 7 are attached with the same symbols. The explanation of the fourth embodiment of the invention is focused on a difference from the first through third embodiments of the invention described above, and explanation of others is omitted.

The first through third embodiments of the invention illustrate control and monitoring systems for a power system in one substation, however, as shown in FIG. 8 wider-ranging monitoring control can be performed by connecting to control and monitoring systems of other substations and power plants through exclusive lines 17 such as an extranet to link the plurality of control and monitoring systems. By connecting to other control and monitoring systems through a network, collecting the information on other control and monitoring systems on the network from other control and monitoring systems through the network, and using the information for judging whether control output to the input/output terminal devices is possible, wide-ranging monitoring control can be properly performed.

What is claimed is:

1. A control and monitoring system for a power system which controls monitoring control objects by supplying a control instruction from a master unit to the plurality of input/output terminal devices provided for each of a plurality of monitoring control objects in a power system, wherein the control instruction requests from all input/output terminal devices, information necessary for judging whether control output to the input/output terminal devices is possible and notifies all input/output terminal devices of selection of one input/output terminal device as control object.

2. The control and monitoring system for a power system according to claim 1, wherein input/output terminal devices that were not selected as control objects are also notified of the control object selection including information for specifying a control object input/output terminal device selected as a control object.

3. The control and monitoring system for a power system according to claim 2, wherein the input/output terminal devices that were not selected as control objects block control for corresponding monitoring control objects according to the control object selection notification.

4. The control and monitoring system for a power system according to claim 3, wherein the respective input/output terminal devices notified of the control object selection have a function for informing their controlled states.

5. The control and monitoring system for a power system according to claim 4, wherein the operations to acquire information necessary for judging whether control output to input/output terminal devices is possible are started as aforementioned in response to the information transmission request outputted from the master unit to the respective input/output terminal devices, and this information transmission request and the control object selection notification are contained in the control instruction.

6. The control and monitoring system for a power system according to claim 5, wherein the control and monitoring system is connected to another control and monitoring system via a network, and collects the information in the network of the other control and monitoring system from the other control and monitoring system via the network, and uses the information as criteria for judging whether control output to the input/output terminal devices is possible.

7. The control and monitoring system for a power system according to claim 2, wherein the respective input/output terminal devices notified of the control object selection have a function for informing their controlled states.

8. The control and monitoring system for a power system according to claim 1, wherein the operations to acquire information necessary for judging whether control output to input/output terminal devices is possible are started as aforementioned in response to the information transmission request outputted from the master unit to the respective input/output terminal devices, and this information transmission request and the control object selection notification are contained in one signal.

9. The control and monitoring system for a power system according to claim 1, wherein the control and monitoring system is connected to another control and monitoring system via a network, and collects the information in the network of the other control and monitoring system from the other control and monitoring system via the network, and uses the information as criteria for judging whether control output to the input/output terminal devices is possible.

* * * * *